No. 788,286. PATENTED APR. 25, 1905.
A. S. STEBBINS & L. M. LAUER.
FINGER BOWL.
APPLICATION FILED JULY 2, 1904.
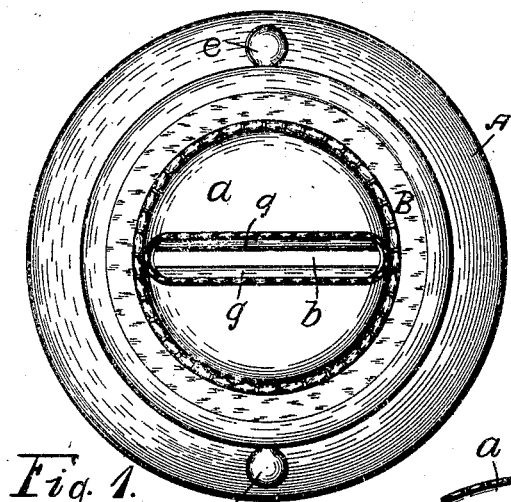
Fig. 1.
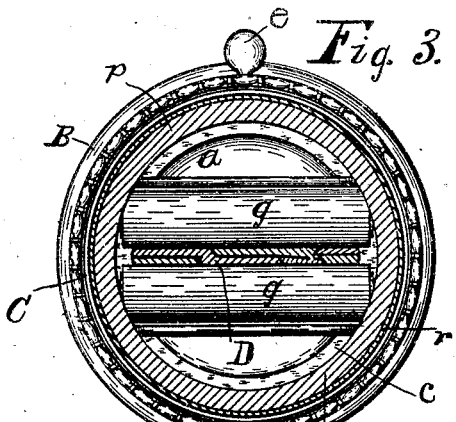
Fig. 3.
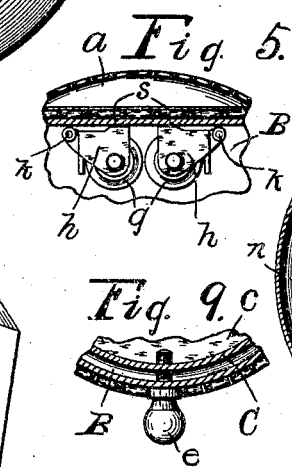
Fig. 5.
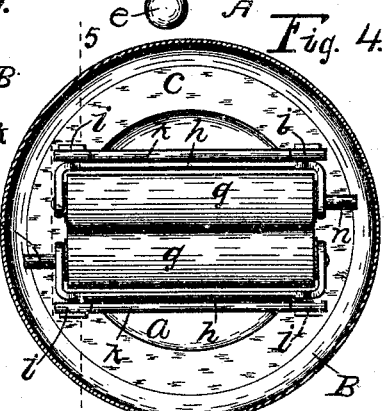
Fig. 4.
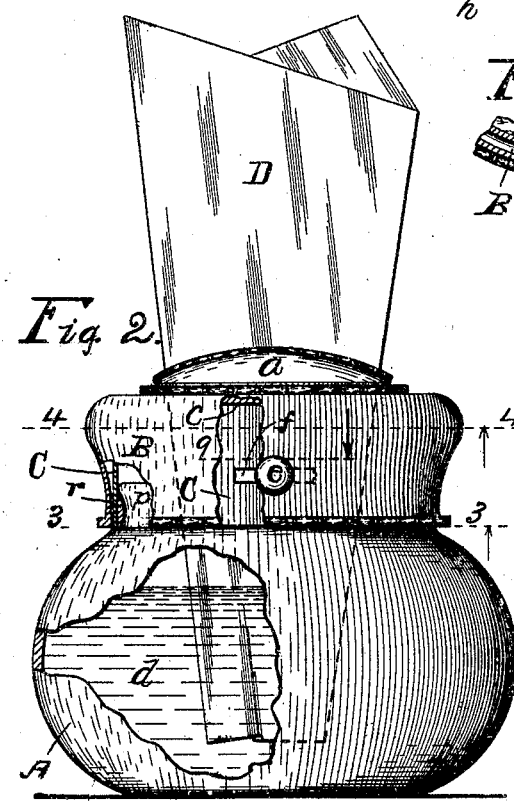
Fig. 2.
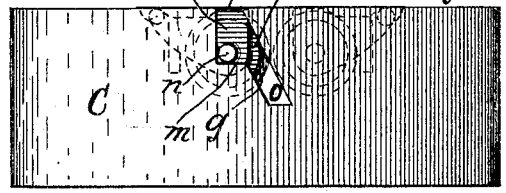
Fig. 9.
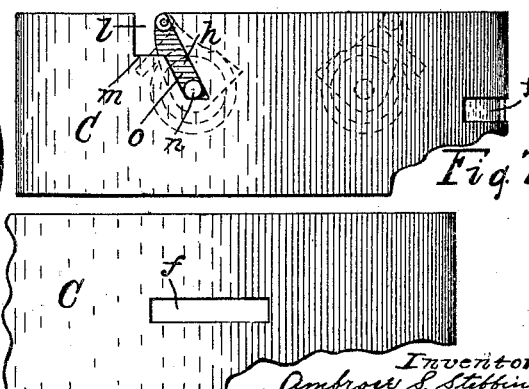
Fig. 6.
Fig. 7.
Fig. 8.
Attest:
M. B. Smith.
M. V. Bayles.
Inventors.
Ambrose S. Stebbins.
Lillian M. Lauer.
By E. B. Whitmore, Atty.

No. 788,286.                                      Patented April 25, 1905.

UNITED STATES PATENT OFFICE.

AMBROSE S. STEBBINS, OF PALMYRA, AND LILLIAN M. LAUER, OF NEW YORK, N. Y.

FINGER-BOWL.

SPECIFICATION forming part of Letters Patent No. 788,286, dated April 25, 1905.

Application filed July 2, 1904. Serial No. 215,169.

*To all whom it may concern:*

Be it known that we, AMBROSE S. STEBBINS, of Palmyra, Wayne county, and LILLIAN M. LAUER, of New York, in the county of New York, State of New York, have invented a new and useful Improvement in Finger-Bowls, which improvement is fully set forth in the following specification and shown in the accompanying drawings.

Our invention is an improved finger-bowl, the same being hereinafter fully described, and more particularly pointed out in the appended claims.

Finger-bowls in common use upon dining-tables, lunch-counters, &c., are open vessels for holding water in which to dip the soiled fingers; but such devices are in a way unsightly and more or less objectionable from the fact that the water in the open bowl is liable to be thrown out or spattered about over the table when in the act of dipping the fingers, and, further, the dipping of the fingers of numerous individuals into water in an open bowl upon the table has an appearance of primitiveness and objectionable untidiness. Observing these and other objections to the use of the open finger-bowls in common use we have aimed to produce one that is more neat and pleasing to a refined taste, a bowl provided with a cover and the contained liquid practically inaccessible with the fingers and out of sight. Aside from providing the bowl with an ornamental perforated cover another main object of the invention is to construct the device with movable parts, so constructed and arranged as to hold a folded napkin or like article in convenient reach of the diner, the napkin piercing the cover of the bowl and having its lower part immersed in the water or liquid within.

A further object of the invention is to provide means for automatically pressing the superfluous water out of the submerged part of the napkin, leaving the same merely well dampened and in proper and desirable condition to be used upon the soiled fingers without the liability of water dripping therefrom.

Other objects and advantages of the invention will be brought out and made to appear in the following specification, reference being had to the accompanying drawings, which, with the reference characters marked thereon, form a part of the specification.

Figure 1 is a plan of our improved finger-bowl. Fig. 2 is a side elevation of the same seen as indicated by arrow in Fig. 1, parts being broken out and other parts sectioned. Fig. 3 is a horizontal section of the bowl on the dotted line 3 3 in Fig. 2, showing the upper parts. Fig. 4 is a horizontal section of the cover on the dotted line 4 4 in Fig. 2, further showing the compressing-rollers and other parts within. Fig. 5 is a vertical cross-section of the cover, taken on the broken dotted line 5 5 in Fig. 4, further showing the parts within the cover. Fig. 6 is a side elevation of the inner band, showing an opening for receiving and controlling the axle of a roller. Fig. 7 is another side elevation of the band, showing it in a slightly different position with the rollers correspondingly thrown apart. Fig. 8 is a side elevation of the band, showing a slot for one of the retaining-screws, parts being broken away. Fig. 9 is a horizontal section of parts of the cover and the band on the dotted line 9 in Fig. 2, further showing the relation of a retaining-screw and the band. Figs. 6, 7, and 8 are drawn to a scale larger than that of the remaining figures.

Referring to the parts shown, A, Figs. 1 and 2, is the body of the finger-bowl, made usually of ornamental glass or of light sheet metal, as aluminium or silver.

B, Figs. 1 to 4, is the cover of the bowl, preferably made of light metal, as aluminium or silver, ornamented to taste.

C, Figs. 2, 3, and 6 to 8, is a cylindrical band of metal encircling the mouth of the bowl, being secured permanently by cement *r* upon the short neck *p* of the body A in a manner that is common in constructing lamps and similar articles. The cover B incloses the band C and is made ornamental in shape and formed with a flat central dome *a*, pierced by an elongated diametrical opening or slot *b*, down through which to thrust a folded napkin or doily D into the liquid *d*, as clearly shown in Fig. 2. The cover B, which is removable from the bowl, is formed with a flat annular inner surface c, Fig. 4, which rests upon the upper edge of the band C, as shown in Fig. 2, when the cover is in place on the bowl, the lower edges of the band and the cover being even, as appears in the figure.

The cover B is adapted to turn in horizontal directions around the rigid band, its motions being limited in both directions by radial retaining pins or screws e e, threaded through thickened parts of the cover on opposite sides, the inner ends of these screws occupying horizontal slots f f in the band. Within the cover is placed a pair of equal coacting rollers g g, Figs. 3 to 5, usually of india-rubber, supported in independent hangers h h, pending from the cover. The rollers are disposed in planes parallel with the central vertical plane of the opening b and on opposite sides thereof, as shown in Fig. 1, the rollers coacting with the opening. Each hanger h is formed with a horizontal hinge-rod k, held to turn in bearings i i, rigid with the surface c of the cover, the turning of the hangers in which bearings serving to bring the rollers close together, as shown in Figs. 4 and 5, or allow them to swing down and apart, as indicated by dotted lines in Fig. 7.

The rollers are formed with axles at their ends to rest in bearings in the adjacent parts of the hangers, the axle n, Fig. 4, at one end of each roller being long and projecting beyond the hanger, as shown, the two lengthened axles pointing in opposite directions. To coact with these extended axles and for the purpose of controlling the rollers, the band C is formed with angular openings l, Figs. 6 and 7, on opposite sides and alike, into which the axles n n extend, respectively. The openings l open out at the upper edge of the band, as shown, each being formed with a downwardly-extended inclined branch o, to be at times occupied by the associated axle n of a roller g and a shoulder m higher up, the latter constituting a rest for the axle, as shown in the figures. When the cover B is turned upon the band C, as above stated, in a manner to carry the axles n n into the respective inclined branches o o of the openings l l, the rollers will be swung downward and wide apart, as indicated by dotted lines in Fig. 7. Turning the cover in the opposite direction upon the band the axles n n will be brought upward onto the seats or rests m m, respectively, as appears in Fig. 6, bringing the rollers close together and nearer the opening or slot b in the cover, as there shown in dotted lines and in full lines in Figs. 4 and 5. The hangers h h for the rollers are formed with slightly upwardly projecting parts s s, Figs. 5 and 6, which meeting the flat surface c as the rollers are swung together, as stated, constitute stops for the upward movements of the rollers.

In using this improved finger-bowl the body or vessel A is first partially filled with water (which may be impregnated with a fine detergent or with a perfume, if desired) and the napkin or similar hand-cloth D folded into a fan-shape form, as shown, the cover B of the bowl being turned, as stated, to open or spread the rollers g g. The pointed end of the folded napkin is then passed downward through the slot b in the cover and between the rollers into the water or liquid d in the bowl, as appers in Fig. 2, after which the cover B is turned back again to close the rollers against the napkin to closely press it and hold it in place. When the services of the napkin are needed, it is drawn out of the bowl, and as it moves upward between the rollers the superfluous water is pressed out of it, the napkin leaving the bowl merely well dampened and in a desirable condition for use upon the fingers.

What we claim as our invention, and desire to secure by Letters Patent, is—

1. A finger-bowl consisting of a vessel for holding liquid, and a cover for the bowl, the cover having an elongated opening adapted to receive a flexible body or cloth, as a napkin.

2. A finger-bowl consisting of a hollow vessel containing liquid, and a slotted cover for the bowl adapted to receive a body, as a napkin, and hold the same with its lower end immersed.

3. A device, such as described, comprising a hollow vessel, a cover for the vessel, formed with an opening at the top, rollers carried by the cover beneath said opening, and means for actuating the rollers.

4. A device, such as described, comprising a hollow vessel, a cover for the vessel, formed with an opening at the top, a pair of coacting rollers held by the cover under the opening, the rollers being movable toward or from each other, and means for controlling them, said cover and rollers preventing access with the fingers to the liquid within the vessel.

5. A finger-bowl comprising a vessel, a cover for the vessel having a diametrical opening, a pair of independent coacting rollers pending within the cover beneath said opening, pivotal hangers for the rollers, and means for turning the hangers on their bearings to move the rollers together or apart.

6. A finger-bowl comprising a hollow open vessel, a perforated band around the mouth of the vessel, a cover for the vessel and the band, adapted to turn on the latter and having a diametrical opening at the top, a pair of coacting rollers carried by the cover beneath said opening each having a lengthened axis engaging in a perforation of the band.

7. A device of the kind described, having an open vessel, a band having opposite inclined openings rigid with the vessel, a cover for the vessel adapted to turn on the band and having a slot at the top, a pair of rollers carried by the cover and coacting with said slot, each roller having an extended and a short axle, the two extended axles being turned in opposite directions and occupying said inclined openings, respectively, and rests in said openings for the extended axles.

8. A finger-bowl consisting of a vessel, a slotted cover for the vessel, a pair of rollers within the cover, pivotal hangers for the rollers pending from the cover and adapted to swing on their bearings to bring the rollers together and adjacent to the slot of the cover, with the opening between the rollers coincident with said slot, and stops limiting the swinging motions of the hangers.

9. As an improved article of manufacture, a finger-bowl, comprising a hollow open vessel, means for closing the open end thereof to prevent insertion of the fingers and permitting the insertion of a napkin, and means within the said vessel and supported by the closing means for removing the surplus of the liquid as the napkin is withdrawn through the egress-opening in the closing means.

In witness whereof we have hereunto set our hands, this 24th day of June, 1904, and this 27th day of June, 1904, respectively, in the presence of two subscribing witnesses for each signature.

AMBROSE S. STEBBINS.
LILLIAN M. LAUER.

Witnesses for Ambrose S. Stebbins:
  ROY BARRETT,
  BESS BROWN.

Witnesses for Lillian M. Lauer:
  GEORGE H. CONE,
  A. G. ACKERMAN.